US010932169B2

(12) United States Patent
Bhattacharyya

(10) Patent No.: US 10,932,169 B2
(45) Date of Patent: Feb. 23, 2021

(54) SYSTEMS AND METHODS FOR DETERMINING TCP TRANSFER TYPES IN LTE-A COMMUNICATION NETWORKS AND HANDLING THEREOF

(71) Applicant: Tata Consultancy Services Limited, Mumbai (IN)

(72) Inventor: Abhijan Bhattacharyya, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 38 days.

(21) Appl. No.: 16/536,953

(22) Filed: Aug. 9, 2019

(65) Prior Publication Data
US 2020/0137648 A1 Apr. 30, 2020

(30) Foreign Application Priority Data
Oct. 30, 2018 (IN) .............................. 201821041048

(51) Int. Cl.
*H04W 36/00* (2009.01)
*H04L 29/08* (2006.01)
*H04W 36/30* (2009.01)

(52) U.S. Cl.
CPC ..... *H04W 36/00837* (2018.08); *H04L 69/326* (2013.01); *H04W 36/03* (2018.08); *H04W 36/30* (2013.01)

(58) Field of Classification Search
CPC ........... H04W 36/00837; H04W 36/03; H04W 36/30; H04L 699/326
See application file for complete search history.

(56) References Cited

U.S. PATENT DOCUMENTS

2010/0279672 A1* 11/2010 Koskela ................ H04W 36/30
455/418
2013/0294283 A1* 11/2013 Van Phan ............. H04W 76/14
370/252
(Continued)

FOREIGN PATENT DOCUMENTS

WO WO 2015/169380 A1 11/2015
WO WO 2017/194161 A1 11/2017

OTHER PUBLICATIONS

Bhattacharyya, et al. "Effect of Mode-Switching on TCP Short Flows During D2D Communication in LTE-A Networks" 2017 IEEE Conf Adv Network Telecomm Systems Dec. 17-20, 2017 (Year: 2017).*
(Continued)

*Primary Examiner* — Jeffrey M Rutkowski
*Assistant Examiner* — Basil Ma
(74) *Attorney, Agent, or Firm* — Finnegan, Henderson, Farabow, Garrett & Dunner LLP

(57) ABSTRACT

Mobile nodes communicating in direct mode (DM) may be compelled, due to their mobility pattern, to switch to infrastructure mode (IM) via conventional uplink/downlink through base station (eNB) to maintain best possible link-quality. When mobile nodes move away from each other, Signal to Interference plus Noise Ratio (SINR) may degrade over D2D link, side link (SL), and eNB is forced to re-schedule nodes to IM, incurring additional delay and potential loss of packets in transit. Embodiments of the present disclosure provide systems and methods that uses information such as flow size, transport layer type, bandwidth and RTT to determine whether request initiated by a mobile node for communication with another mobile node is of a particular transfer flow type and based on the request type (i) DM is enabled for communication or (ii) DM mode
(Continued)

is disabled and initiates, within the mobile node, request to activate IM mode for communication.

14 Claims, 14 Drawing Sheets

(56) References Cited

U.S. PATENT DOCUMENTS

| | | |
|---|---|---|
| 2013/0324114 A1 | 12/2013 | Ragnothaman et al. |
| 2014/0160950 A1* | 6/2014 | Vasudevan ............ H04W 76/23 370/252 |
| 2018/0242122 A1 | 8/2018 | Bi et al. |
| 2020/0128437 A1* | 4/2020 | Caretti ................. H04W 76/23 |

OTHER PUBLICATIONS

Nardini et al. "Fast and agile lossless mode switching for D2D communications in LTE-Advanced networks" IEEE VTC Spring 2016 (Year: 2016).*

Nardini et al. "Performance evaluation of TCP-based trafic over direct communications in LTE-Advanced" IEEE VTC Spring 2016 (Year: 2016).*

\* cited by examiner

__US 10,932,169 B2__

SYSTEMS AND METHODS FOR DETERMINING TCP TRANSFER TYPES IN LTE-A COMMUNICATION NETWORKS AND HANDLING THEREOF

PRIORITY CLAIM

This U.S. patent application claims priority under 35 U.S.C. § 119 to: India Application No. 201821041048, filed on Oct. 30, 2018. The entire contents of the aforementioned application are incorporated herein by reference.

TECHNICAL FIELD

The disclosure herein generally relates to communication networks, and, more particularly, to systems and methods for determining Transmission Control Protocol (TCP) transfer types in Long Term Evolution-Advanced (LTE-A) communication networks and handling thereof.

BACKGROUND

Proximity Service (ProSe)/device-to-device (D2D) communication, a proposed feature of LTE-A standardization under 3GPP, is promising to increase network capacity and is envisioned to extend application of LTE to Vehicle to Vehicle (V2V) communication in near future. In network assisted ProSe, the D2D enabled mobile nodes can be in any of the two modes: Direct Mode (DM) or Infrastructure Mode (IM). In IM, the mobile nodes communicate via the NodeB (the base stations) like the usual communication system. In DM, the mobile nodes communicate directly, enabling D2D/ProSe without involving the NodeB. The ProSe communication channel is known as Side Link (SL). While in the middle of an ongoing TCP session, the nodes already communicating in D2D mode or direct mode (DM) may be compelled, due to their mobility pattern, to switch back to infrastructure mode (IM) via conventional uplink/downlink (UL/DL) through the LTE-A base station (i.e., eNB). This switch over may be triggered by the eNB to maintain the best possible link quality. For instance, if two vehicular nodes, communicating in DM, move away from each other, the Signal to Interference plus Noise Ratio (SINR) may degrade over the D2D link, the side link (SL), to such a level that the eNB is forced to re-schedule the nodes to IM. This leads to a change in connection state as the connection now has to be routed via the eNB, and this change-over needs certain additional processes to be performed incurring additional delay and potential loss of packets in transit. The loss in this case is neither due to impairment in radio channel nor congestion in network; neither is there a handover between eNBs. However, loss due to D2D Mode Switching causes Retransmission Time Out (RTO) and the TCP state-machine moves into slow-start phase inferring a deep congestion in the network. Thus the effective throughput decreases and the time to complete the transmission of the whole application payload increases. So mode switching for an ongoing TCP connection needs to be handled gracefully, and still remains to pose a challenge.

SUMMARY

Embodiments of the present disclosure present technological improvements as solutions to one or more of the above-mentioned technical problems recognized by the inventors in conventional systems. For example, in one aspect, there is provided a processor implemented method for determining Transmission Control Protocol (TCP) transfer request types in Long Term Evolution-Advanced (LTE-A) communication networks and handling thereof. The method comprises: receiving, by a transfer flow indicator comprised in a Long-Term Evolution-Advanced (LTE-A) stack, a first set of information comprising a flow size and a transport layer type specific to a request being initiated by a first communication device; obtaining, from a LTE physical layer comprised in the LTE-A stack, a second set of information comprising bandwidth and a Round Trip Time (RTT) specific to the request being initiated by the first communication device; determining, by the transfer flow indicator comprised in the LTE-A stack, based on the first set and second set of information, whether the request being initiated by the first communication device is one of a first TCP transfer flow type or a second TCP transfer flow type, wherein the first TCP transfer flow type and the second TCP transfer flow type are different from each other; based on the determined request, performing one of: enabling a first mode for communication between the first communication device and a second communication device; or triggering, by the transfer flow indicator, a Radio Resource Control layer comprised in the LTE-A stack of the first communication device, to (i) identify the first mode to be disabled in the first communication device and (ii) request for permission to use one or more radio resources for a second mode for communication between the first communication device and the second communication device. In an embodiment, the first mode is enabled when the request is determined as the long transfer flow type. In an embodiment, the permission to activate the second mode is initiated when the request is determined as the short transfer flow type.

In an embodiment, the first mode is a Direct Mode (DM) or a Device to Device (D2D) communication mode. In an embodiment, the second mode is an Infrastructure Mode (IM).

In an embodiment, the first TCP transfer flow type is a short transfer flow type. In an embodiment, the second TCP transfer flow type is a long transfer flow type.

In an embodiment, the first mode is enabled when the request is determined as the long transfer flow type. In an embodiment, the permission to activate the second mode is initiated when the request is determined as the short transfer flow type.

In another aspect, there is provided a Long-Term Evolution-Advanced (LTE-A) stack system for determining TCP transfer request types in LTE-A communication networks and handling thereof. The system comprises: a memory storing instructions; one or more communication interfaces; and one or more hardware processors coupled to the memory via the one or more communication interfaces, wherein the one or more hardware processors are configured by the instructions to receive, via a transfer flow indicator comprised in the (LTE-A) stack system, a first set of information comprising a flow size and a transport layer type specific to a request being initiated by a first communication device, wherein the LTE-A stack system is comprised in the first communication device; obtain, from a LTE physical layer comprised in the LTE-A stack system, a second set of information comprising bandwidth and a Round Trip Time (RTT) specific to the request being initiated by the first communication device; determining, by the transfer flow indicator comprised in the LTE-A stack system, based on the first set and second set of information, whether the request being initiated by the first communication device is one of a first TCP transfer flow type or a second TCP transfer flow type, wherein the first TCP transfer flow type and the second TCP transfer flow type are different from each other; based on the determined request, performing one of: enabling a first mode for communication between the first communication device and a second communication device; or triggering by the transfer flow indicator, a Radio Resource Control layer comprised in the LTE-A stack system of the first communication device, to (i) identify the first mode to be disabled in the first communication device and (ii) request for permission to use one or more radio resources for a second mode for communication between the first communication device and the second communication device. In an embodiment, the first mode is enabled when the request is determined as the long transfer flow type. In an embodiment, the permission to activate the second mode is initiated when the request is determined as the short transfer flow type.

In an embodiment, the first mode is a Direct Mode (DM) or a Device to Device (D2D) communication mode. In an embodiment, the second mode is an Infrastructure Mode (IM).

In an embodiment, the first TCP transfer flow type is a short transfer flow type. In an embodiment, the second TCP transfer flow type is a long transfer flow type. In an embodiment, the first mode is enabled when the request is determined as the long transfer flow type. In an embodiment, the permission to activate the second mode is initiated when the request is determined as the short transfer flow type.

In yet another aspect, there are provided one or more non-transitory machine readable information storage mediums comprising one or more instructions which when executed by one or more hardware processors causes a method for determining TCP transfer request types in LTE-A communication networks and handling thereof. The instructions (or method) comprises: receiving, by a transfer flow indicator comprised in a Long-Term Evolution-Advanced (LTE-A) stack, a first set of information comprising a flow size and a transport layer type specific to a request being initiated by a first communication device; obtaining, from a LTE physical layer comprised in the LTE-A stack, a second set of information comprising bandwidth and a Round Trip Time (RTT) specific to the request being initiated by the first communication device; determining, by the transfer flow indicator comprised in the LTE-A stack, based on the first set and second set of information, whether the request being initiated by the first communication device is one of a first TCP transfer flow type or a second TCP transfer flow type, wherein the first TCP transfer flow type and the second TCP transfer flow type are different from each other; based on the determined request, performing one of: enabling a first mode for communication between the first communication device and a second communication device; or triggering, by the transfer flow indicator, a Radio Resource Control layer comprised in the LTE-A stack of the first communication device, to (i) identify the first mode to be disabled in the first communication device and (ii) request for permission to use one or more radio resources for a second mode for communication between the first communication device and the second communication device. In an embodiment, the first mode is enabled when the request is determined as the long transfer flow type. In an embodiment, the permission to activate the second mode is initiated when the request is determined as the short transfer flow type.

In an embodiment, the first mode is a Direct Mode (DM) or a Device to Device (D2D) communication mode. In an embodiment, the second mode is an Infrastructure Mode (IM).

In an embodiment, the first TCP transfer flow type is a short transfer flow type. In an embodiment, the second TCP transfer flow type is a long transfer flow type.

In an embodiment, the first mode is enabled when the request is determined as the long transfer flow type. In an embodiment, the permission to activate the second mode is initiated when the request is determined as the short transfer flow type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
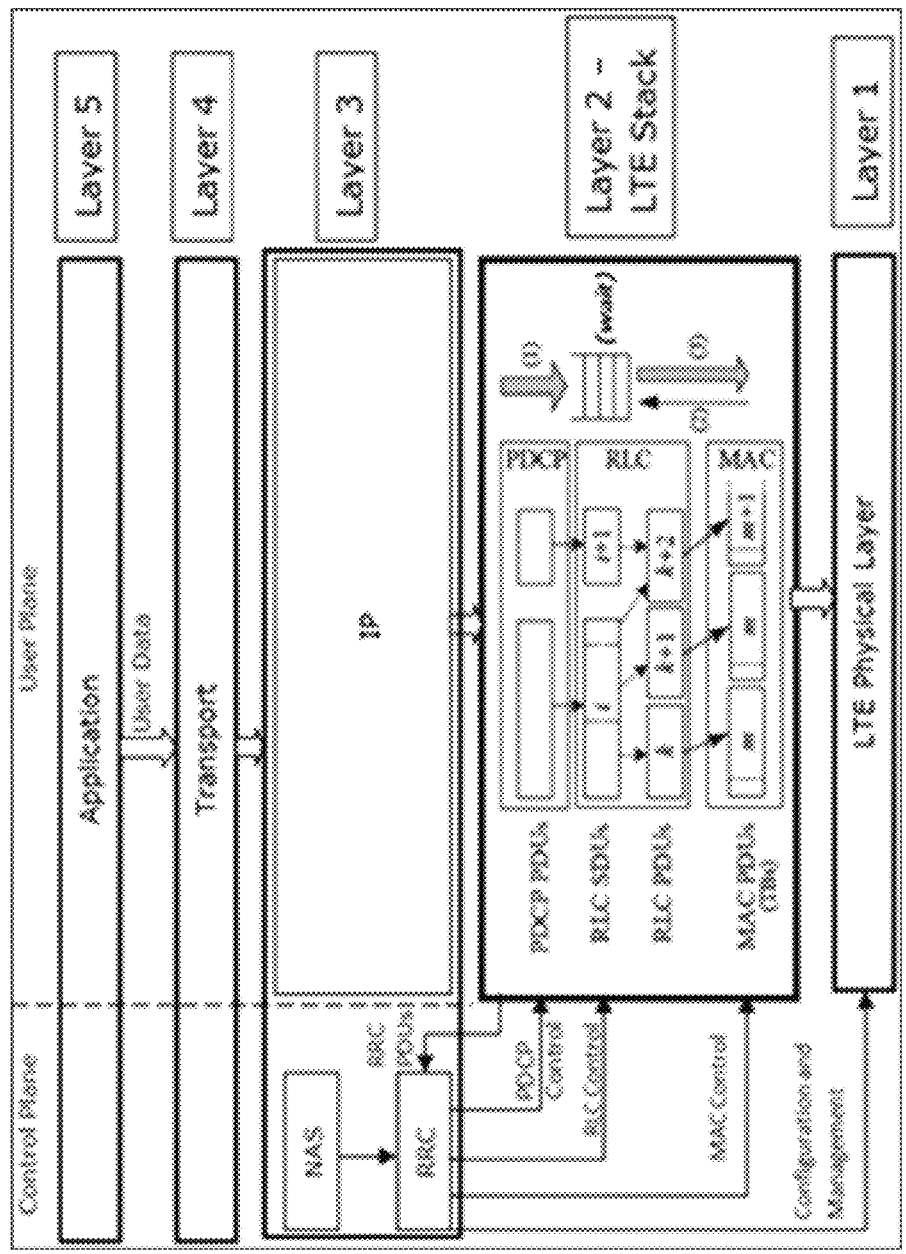
FIG. 1 depicts protocol architecture and data flow in a typical LTE-A stack as known in the conventional art.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As discussed above mode switching for an ongoing TCP connection needs to be handled gracefully, and still remains to pose a challenge. It has been observed that mode switching during a short transfer on TCP gets affected very heavily. A transfer of payload that could have happened just over few milliseconds time could take seconds.

Transmission Control Protocol (TCP) is a connection oriented protocol for reliable delivery of data from source to destination. TCP's congestion control mechanism ensures fair utilization of the available bandwidth. However, the design assumptions were: packet loss happens only due to congestion in the network, and the usual exchange model is similar to File Transfer Protocol (FTP) or Telnet protocol which maintains long sessions of data transfer. But, both the design assumptions did not sustain long with the advancement of the Internet. Firstly, mobile internet added several additional sources of loss as per research works, including signal impairments, and user mobility. Secondly, as World Wide Web (WWW), powered with HyperText Transfer Protocol (HTTP) running over TCP, became the most widely used application, dominant pattern for exchanges over the Internet turned out to be short transfers of packets. Subsequently, the original TCP congestion control mechanism, designed for preventing events like melting down, proved to be inefficient in terms of resource utilization for such short transfers. The inefficiency became even more prominent with ever increasing bandwidth of the communication links in both wired as well as wireless channels.

Though TCP short transfer has been well studied for conventional Internet, embodiments of the present disclosure revive this to analyze it in the context of upcoming vehicle-to-vehicle (V2V) communication for traffic safety in intelligent transportation systems (ITS) in smart cities. In convention research works it has been observed that, smart cars combined with V2V technology is going to be the building block of the smart cities. Proximity Service (ProSe)/device-to-device (D2D) communication, a proposed feature of LTE-A standardization under 3rd Generation Partnership Project (3GPP), is promising to increase the network capacity and is envisioned to extend the application of LTE to V2V communication in near future. Embodiments of the present disclosure provide systems and methods that implement technique(s) to transfer a few kilo bytes of data (which could have been transmitted in one Round Trip Time or RTT had there been no congestion control algorithm running) in the context of D2D communication between two mobile nodes, henceforth referred as User Equipment or UE or mobile communication device(s), in two vehicles. While in the middle of an ongoing TCP session, the nodes already communicating in D2D mode or direct mode (DM) may be compelled, due to their mobility pattern, to switch back to infrastructure mode (IM) via conventional uplink/downlink (UL/DL) through the LTE-A base station (i.e., eNB). This switch over may be triggered by the eNB to maintain the best possible link quality. For instance, if two vehicular nodes communicating in DM move away from each other, the Signal to Interference plus Noise Ratio (SINR) may degrade over the D2D link, called side link (SL), to such a level that the eNB is forced to re-schedule the nodes to IM. This leads to a change in connection state as the connection now has to be routed via the eNB, and this change-over needs certain additional processes to be performed incurring additional delay and potential loss of packets in transit. The loss in this case is neither due to impairment in radio channel nor congestion in network; neither is there a handover between eNBs as discussed above. Hence, it is extremely necessary to investigate TCP behavior under such conditions so that corresponding corrective measures can be proposed.

The salient contributions of the embodiments of the present discourse as its associated systems and methods include: (i) simulation of a realistic situation for V2V communication to show the effect of mode-switch for a very short TCP session; the simulation setting presented in the present disclosure can be reused as part of a test-bed for future researches, (ii) experimental analyses based on the different metrics captured across the protocol stack during investigation to reveal the cascading effect of the changing state of the access medium up to the higher layer of the stack during mode-switch for a short transfer, (iii) extensive experiments to show that standard extensions of TCP, such as Selective Acknowledgement (SACK) and Limited Transmit, are of no help in case of short flows (or also referred as short transfer flows or short transfer flows) under mode-switching; the causal analysis of the results is presented to bring out the uniqueness of the problem that TCP has to deal with in case of mode-switching, and (iv) the present disclosure provides recommendation for an application-aware cross-layer solution for the potential application and network designers.

The problem of TCP short flow over the Internet has been identified long back in the days. Since then researchers have tried several way outs. For instance, research work have analyzed how the network buffer size impacts the TCP short flows. While other research works have proposed TCP Fast Open to cater very short transactions over TCP. But all these works belong to the pre-LTE era, and hence do not deal with problems/issue(s) to be addressed that pertain to D2D communication.

One of the research work discusses TCP performance for different congestion control algorithms in a simulated LTE-A environment under frequent mode-switching. However, the research work has considered along TCP session for reliable transfer of a file of size 1 GB. From the simulation set up of this very research work, it was also evident that the nodes undergo mode-switching several times which impacts any long TCP connection with vehicles oscillating at very high speed. Further, it was also observed that different link level parameters change at the point of mode-switching.

It is known that conventional TCP congestion control approach suffers from two key aspects in dealing with short transfers: slow start and loss detection.

Problems with TCP Short Flow:

Slow-Start: TCP congestion control algorithms grow or shrink the congestion window (cwnd) based on the feedback from the receiving end-point (through the acknowledgement or ACK). These all start conservatively and take at least one RTT to grow the window size. However, in the attempt to avoid the risk of flooding the network, the network bandwidth remains largely underutilized. This becomes worse for a short flow. By the time a host ramps up to optimal transmission speed, the entire data transfer could have been completed without invoking any congestion control at all. Moreover, increase in communication bandwidth further worsens the problem.

Loss Detection: TCP sender detects congestion based on two indications: timeout and three duplicate ACKs (dupacks). The short flows are not a good candidate for detecting loss using three dupacks. There may not be enough increase in congestion window (cwnd) to allow for three dupacks. Loss in short connection is often detected only after a timeout. But it may happen that the timeout is detected after the entire data has been sent. As a result, timeouts on short connections are not very effective either in reducing the overall traffic or in stabilizing the network. Occurrence of a loss in a short TCP transfer may, in effect, increase the transfer time manifold.

Overview of LTE/LTE-A Protocol Stack:

LTE/LTE-A is an all IP system. The protocol architecture can be broadly divided into: (i) Control Plane (responsible for configuring the lower layers and handling radio-specific functionality depending on the state of the UE), and (ii) User Plane (responsible for handling the application data) as shown in FIG. 1. More specifically, FIG. 1 depicts protocol architecture and data flow in a typical LTE-A stack as known in the conventional art. The LTE-A protocols actually form Layer 2 of the stack. However, in case of control plane, two components, Non Access Stratum (NAS) and Radio Resource Control (RRC), become part of Layer 3. In the user plane, IP packets traverse the Packet Data Convergence Protocol (PDCP) layer. Here, they are ciphered and numbered to form PDCP Protocol Data Units (PDUs). The PDCP PDUs flow down to the Radio Link Control (RLC) as RLC Service Data Units (SDUs). These are kept in the RLC buffer. Each flow has one associated PDCP entity and one RLC entity. The PDCP layer assigns a Logical Connection Identifier (LCID), as per the signals received during RRC connection set up, which uniquely identifies the logical channel instance within the scope of one pair of source and destination of a corresponding MAC flow.

There can be three RLC modes: transparent, unacknowledged, and acknowledged. RLC performs segmentation/concatenation of RLC SDUs on transmission, and reassembly, duplicate detection and reordering of RLC PDUs on reception. Each time the RLC receives a MAC (Media Access Control) request for an RLC PDU, it responds by de-queuing appropriate number of RLC SDUs and then fragmenting or concatenating as necessary to form the RLC PDU. The MAC layer adds the MAC header on top of the RLC PDU and forms a transport block (TB). The transmission of TB happens in sub-frames of 1 ms duration and is paced at Transmission Time Intervals.

In the control plane, the Non Access Stratum manages session of the UE with the packet data network over IP connectivity, and Radio Resource Control signaling between UE and eNB and the configuration of underlying layers. Beyond RRC, information is processed by PDCP, RLC, MAC and Physical layer.

Overview of ProSe/D2D in LTE-A Network:

As per the concept of proximity based service, if two UEs are close to each other then they should be able to communicate directly without routing via the eNB and the core network. This way the effective network increased. Embodiments of the present disclosure deals with a D2D within a single cell scenario, i.e., D2D enabled UEs under the coverage area of a single eNB.

Use Case: Out of the several possible applications of D2D in immediate and near future, the present disclosure deals with possible scenario from V2V communication. The all IP based LTE-A, coupled with higher layer protocol offerings like TCP, is promising to be a technology of choice for future V2V communication, which is going to be an important aspect of smart cities.

Mode-Switching in D2D: The radio resources to different UEs in D2D mode are allocated by the corresponding eNB. However, as seen in the research work, the decision switch is one of the open research areas in unicast D2D communication. While a transmission power based selection approach is proposed in research works, the present disclosure implements mode-switching based on channel quality approach. The channel quality is actually dependent on the positions of the nodes. So, the SL channel quality may degrade at a point in time UEs move away from each other. This is quite possible in a V2V scenario. A path through the eNB may provide a better channel under such circumstances, and the UEs should back to connect via the eNB (i.e., IM) when the channel quality in SL degrades. In such a scenario, the eNB is responsible for re-assigning the radio resources.

D2D Resource Allocation: In an LTE-A system, UEs equipped with a Single Carrier-Frequency Division Multiple Access (SC-FDMA) receiver, request UL resources through a Random Access Procedure (RAC). RAC requests are responded by scheduling the UE in a future Transmission Time Interval, and are re-iterated if unanswered post scheduling is done based on the Buffer Status Report (BSR). UEs periodically send the (CQI) to the eNB, which enables instantaneous Transport Block Size Index for the UEs.

However, an important question here is how to decide whether a UE is to be allocated for D2D. According to research work(s), the BSR from the transmitting UE should indicate whether the UE is interested in simple UL or a D2D resource allocation. But it is not specified how the UE decides between UL and D2D and how the information is carried in BSR. The BSR comes with a specific LCID which indicates the flow direction. As per implementation in research work, a new flow ID for 'D2D has been added to differentiate between UL and D2D resource allocation requests. A method for UE to decide the mode during channel access has been proposed in research work. Let UE1 be a mobile node which needs to transmit to UE2 in D2D mode. According to conventional research work, the UE1 first probes for UE2. The probing process leads to a channel quality estimate for the potential D2D link. Looking at the estimate, eNB can decide between UL and D2D, if UE1 registers its interest in D2D communication through the BSR.

Figure 2A:
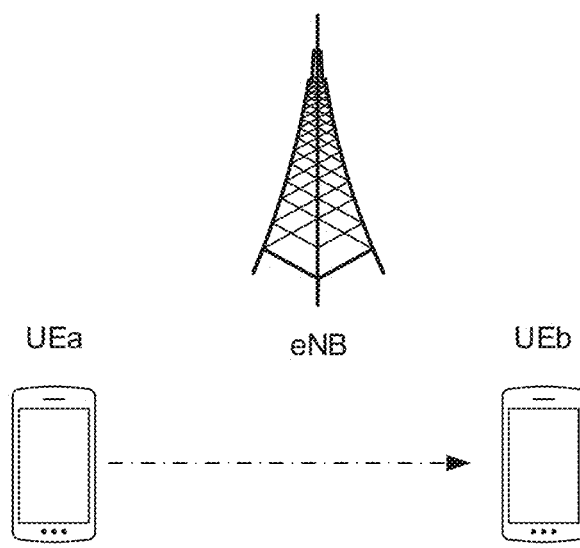
FIGS. 2A and 2B depict different connection configurations before and after mode-switching as known in the conventional art.
Figure 2B:
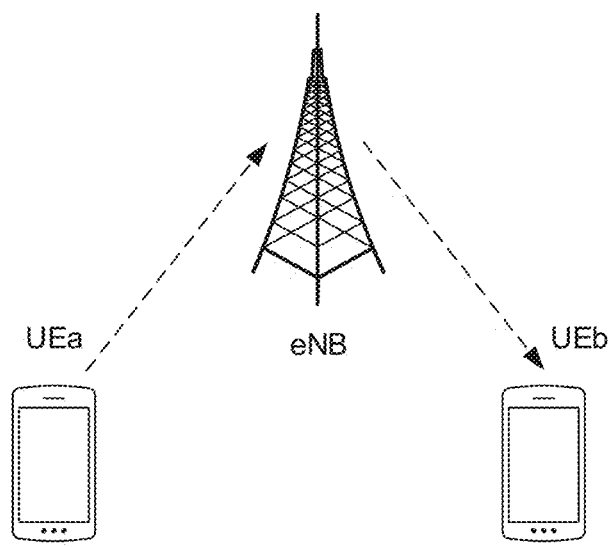

How DM-IM switching affects communication: The mode-switching leads to certain change of connection-state in UEs as well as in eNB leading to losses in the network. As in conventional research work, assuming that two UEs 'a' and 'b' have been scheduled to communicate in DM (refer FIG. 2A). So, a PDCP peering session, with its own sequence numbers and ciphering parameters, will be established between the UEs. This requires two different PDCP peering sessions to be used (refer FIG. 2B) when the communication is switched to IM. More specifically, FIGS. 2A and 2B, with reference to FIG. 1, depict mode-switching scenarios as known in the conventional art. One peering is between 'a' and the eNB (UL part), another between the eNB and 'b' (DL part). Since these two PDCP sessions are independent, connection state parameters (such as sequence numbers, and ciphering/deciphering keys) are unrelated and have to be different. Accordingly, the RLC PDU sequence numbers in SL are no longer valid in the UL/DL peering in IM. Consequently the data in the RLC buffer for the DM connection becomes invalid as the connection state is being changed in IM. So, the fragments in the old buffers at the respective UEs have to be discarded which incurs loss of data.

Since TCP is a reliable connection oriented protocol, these lower-layer losses affect the TCP connection state. TCP tries to recover from the loss, which in this case is due to neither network congestion nor impairments in the wireless link. However, due to its legacy design limitation, TCS has no other choice but to consider the loss due to mode-switch as network congestion and try to recover using the conventional congestion control mechanism.

Referring now to the drawings, and more particularly to FIGS. 3 through 13, where similar reference characters denote corresponding features consistently throughout the figures, there are shown preferred embodiments and these embodiments are described in the context of the following exemplary system and/or method.

Figure 3:
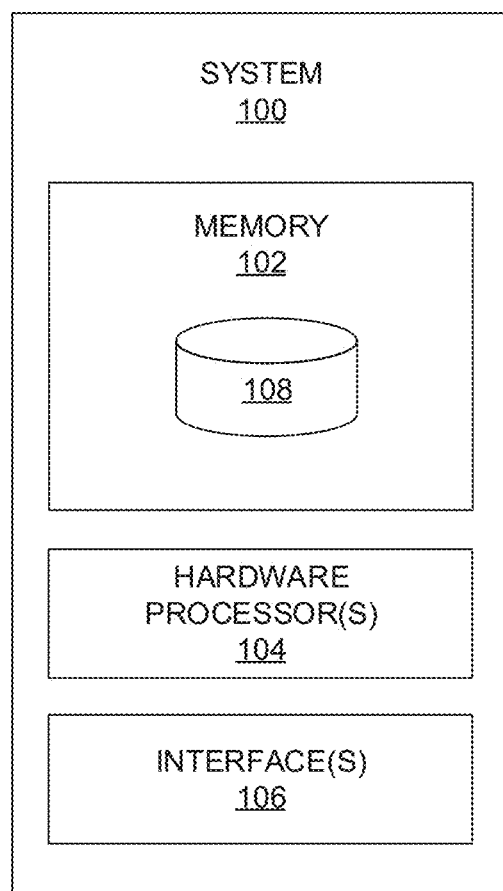
FIG. 3 illustrates an exemplary block diagram of a LTE-A stack system for determining TCP transfer request types in LTE-A communication networks and handling thereof, in accordance with an embodiment of the present disclosure.

FIG. 3 illustrates an exemplary block diagram of a system 100 for determining TCP transfer request types in LTE-A communication networks and handling thereof, in accordance with an embodiment of the present disclosure. The system 100 may also be referred as 'mode switching identification system' or 'transfer type handling system' or 'LTE-A stack system' or 'LTE-A stack' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to flow size, transport layer type, bandwidth, round trip time, and the like specific to a request initiated by a mobile communication device. In an embodiment, the memory 102 may store one or more technique(s) (e.g., mode switching identifying technique(s), and the like) which when executed by the one or more hardware processors 104 perform the methodology described herein. The memory 102 may further comprise information pertaining to input (s)/output(s) of each step performed by the systems and methods of the present disclosure.

Figure 4:
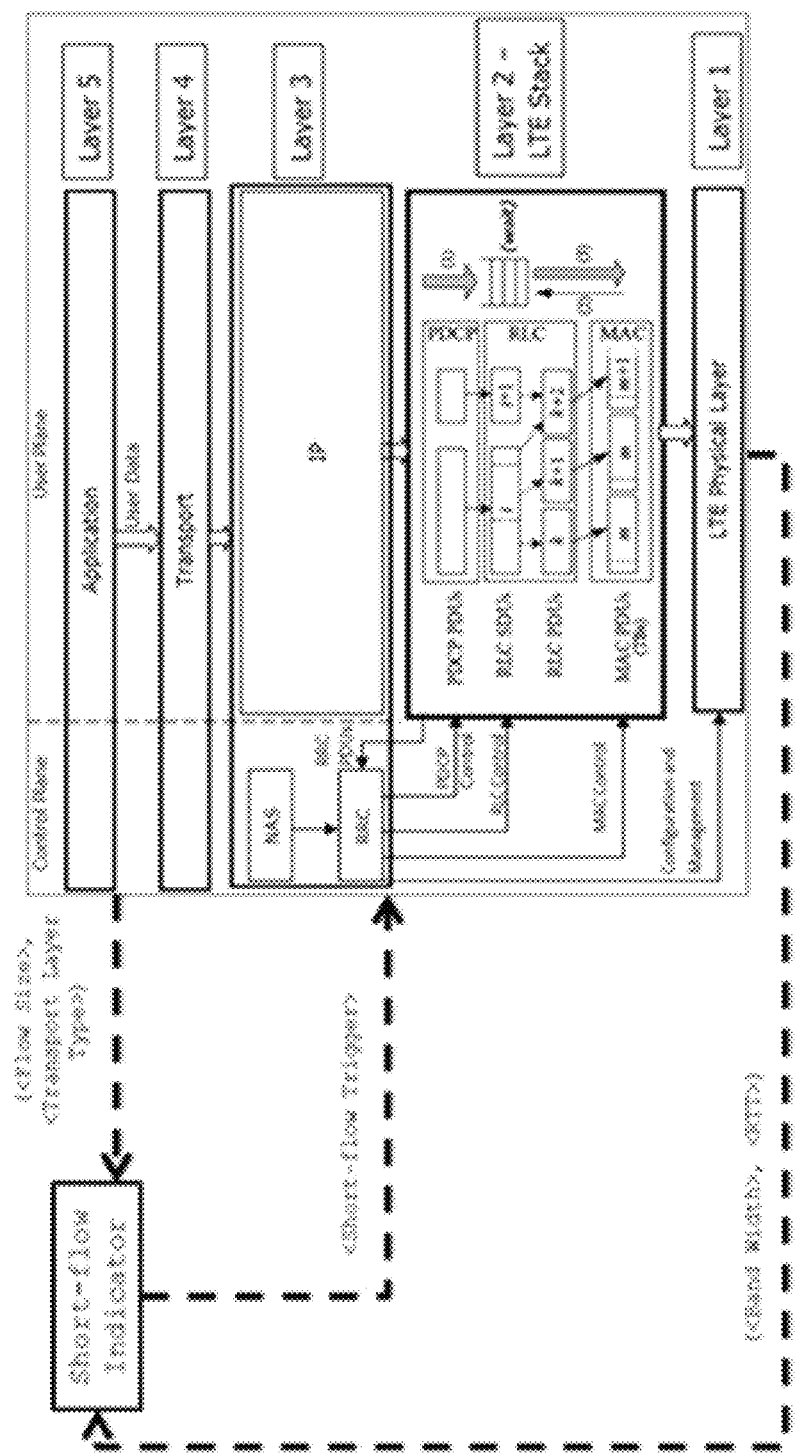
FIG. 4 illustrates an exemplary block diagram of the LTE-A stack system comprised in a mobile communication device for determining TCP transfer request types in LTE-A communication networks and handling thereof, in accordance with an embodiment of the present disclosure.

FIG. 4, with reference to FIG. 3, illustrates an exemplary block diagram of the LTE-A stack system comprised in a mobile communication device for determining TCP transfer request types in LTE-A communication networks and handling thereof, in accordance with an embodiment of the present disclosure. More specifically, FIG. 4, illustrates a high level overview of various components of the system 100 of FIG. 3.

Figure 5:
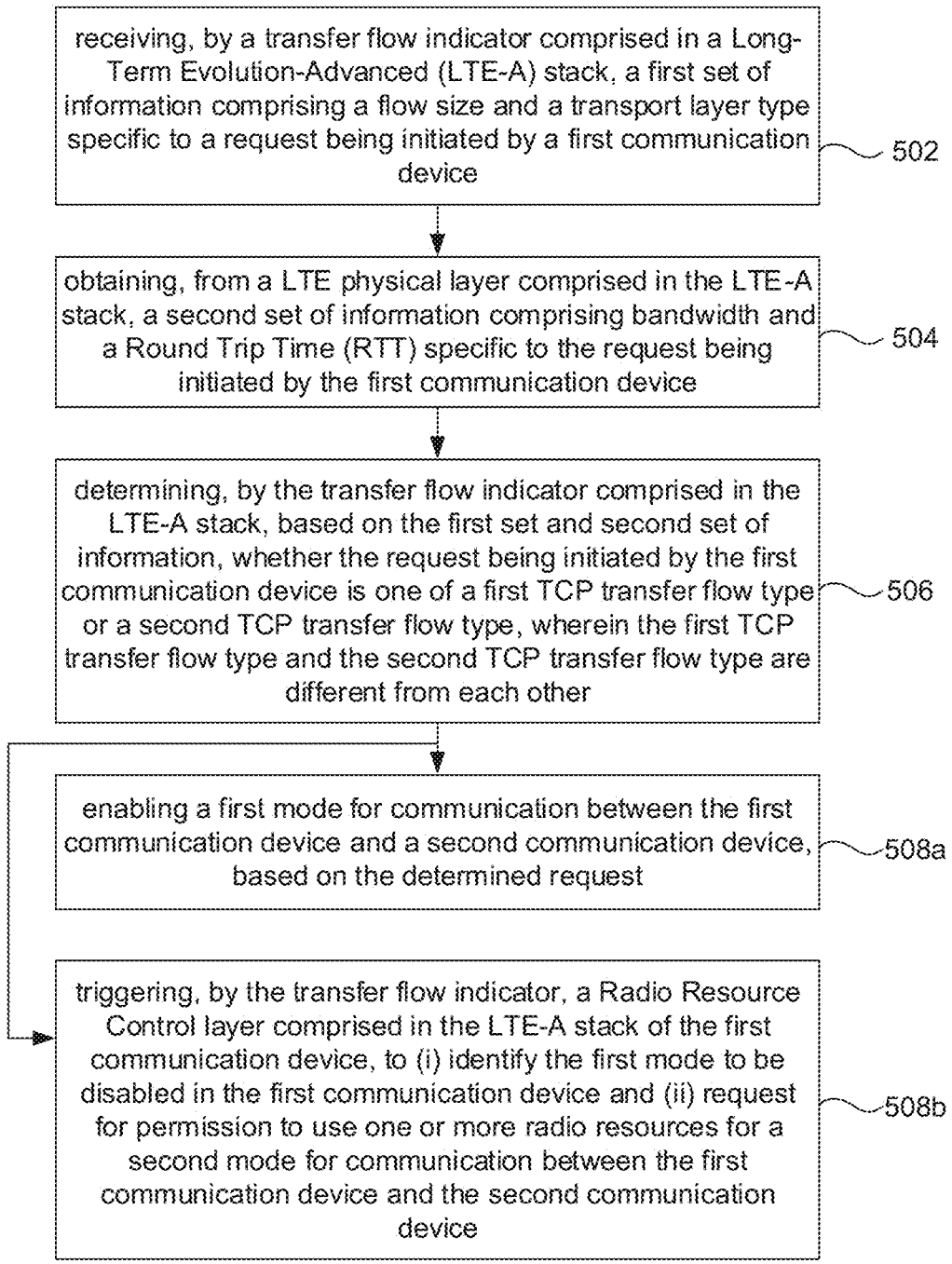
FIG. 5 illustrates an exemplary flow diagram of a method for determining TCP transfer request types in LTE-A communication networks and handling thereof using the LTE-A stack system comprised in the mobile communication device, in accordance with an embodiment of the present disclosure.

FIG. 5, with reference to FIGS. 3-4, illustrates an exemplary flow diagram of a method for determining TCP transfer request types in LTE-A communication networks and handling thereof using the LTE-A stack system comprised in the mobile communication device, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 3, components of the system 100 of FIG. 4 and the flow diagram as depicted in FIG. 5. In an embodiment of the present disclosure, at step 502, a transfer flow indicator (e.g., short flow indicator) comprised in the Long-Term Evolution-Advanced (LTE-A) stack system 100, receives a first set of information comprising a flow size (e.g., 3 KB) and a transport layer type (e.g., Transmission Control Protocol (TCP) specific to a request being initiated by a first communication device. In an embodiment, information pertaining to the flow size and transport layer type is received from an application layer (e.g., layer 5 of FIG. 4). In addition to receiving the first set of information, in an embodiment of the present disclosure, at step 504, the transfer flow indicator obtains from a LTE physical layer comprised in the LTE-A stack system, a second set of information comprising bandwidth (e.g., 10 MB) and a Round Trip Time (RTT) (e.g., 40 milliseconds) specific to the request being initiated by the first communication device. In an embodiment, FIG. 4 depicts transmission of the second set of information from the LTE physical layer (e.g., refer layer 1) to the transfer flow indicator.

Based on the first set of information and the second set of information, at step 506, the transfer flow indicator comprised in the LTE-A stack system 100 determines whether the request being initiated by the first communication device is one of a first TCP transfer flow type or a second TCP transfer flow type. In an embodiment of the present disclosure, the first TCP transfer flow type and the second TCP transfer flow type are different from each other. For instance, the first TCP transfer flow type is a short transfer flow type, in one example embodiment, and the second TCP transfer flow type is a long transfer flow type.

Based on the determined request, the LTE-E stack system either (i) enables a first mode for communication between the first communication device and a second communication device at step 508a, or (ii) triggers via the transfer flow indicator at step 508b, a Radio Resource Control layer comprised in the LTE-A stack system 100 of the first communication device, to (a) identify the first mode to be disabled in the first communication device and (b) request for permission to use one or more radio resources for a second mode for communication between the first communication device and the second communication device. In an embodiment, the first mode is a Direct Mode (DM) or a Device to Device (D2D) communication mode. In an embodiment, using the first mode or the Direct Mode (DM) or D2D communication mode, user data (or payload or data) can be directly transmitted between terminals (or mobile communication devices or UE) without routing via eNodeBs (or base station(s)) and core network. In an embodiment, the second mode is an Infrastructure Mode (IM). In an embodiment, the second mode or Infrastructure mode (IM) is an 802.11 networking framework in which devices communicate with each other by first going through an Access Point (AP). In infrastructure mode, wireless devices can communicate with each other or can communicate with a wired network.

More specifically, the first mode is enabled for communication between the first communication device and the second communication device when the request is determined as the long transfer flow type. In an embodiment of the present disclosure, the permission to activate the second mode is initiated by the first communication device when the request is determined as the short transfer flow type. As can be seen from the above steps 508a and 508b, both the decisions of enabling the first mode and disabling the first mode thereby requesting for permission to activate second mode are being taken by the first mobile communication device which has initiated the request (e.g., data transfer request). In an embodiment of the present disclosure, the systems and methods may be implemented in existing communication network standards (e.g., 4G) or upcoming communication network standards (e.g., 5G and so on).

Figure 6:
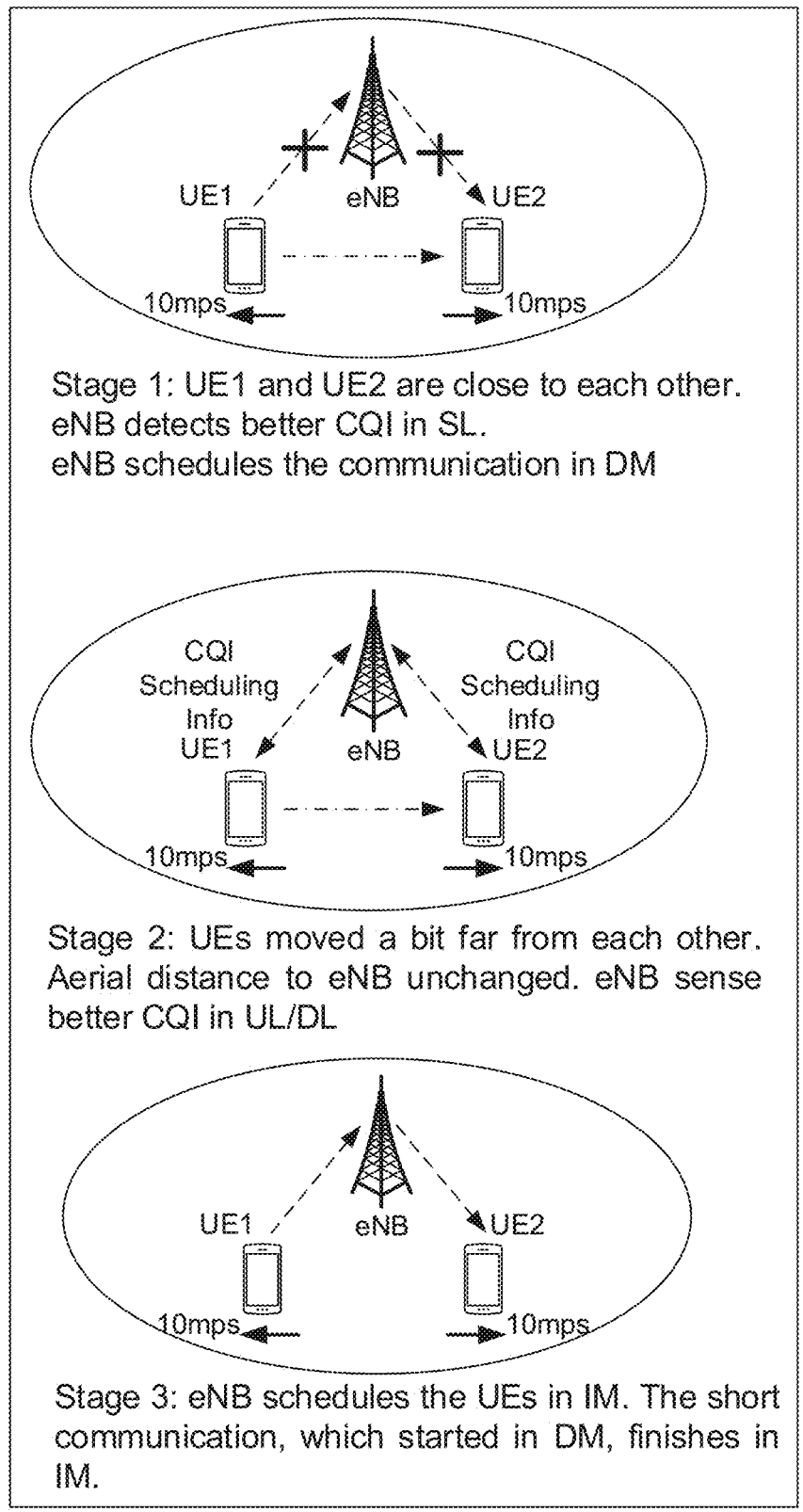
FIG. 6 depicts flow of events between mobile communication devices (UE1 and UE2) and a base station (eNB), in accordance with an example embodiment of the present disclosure.
Figure 7:
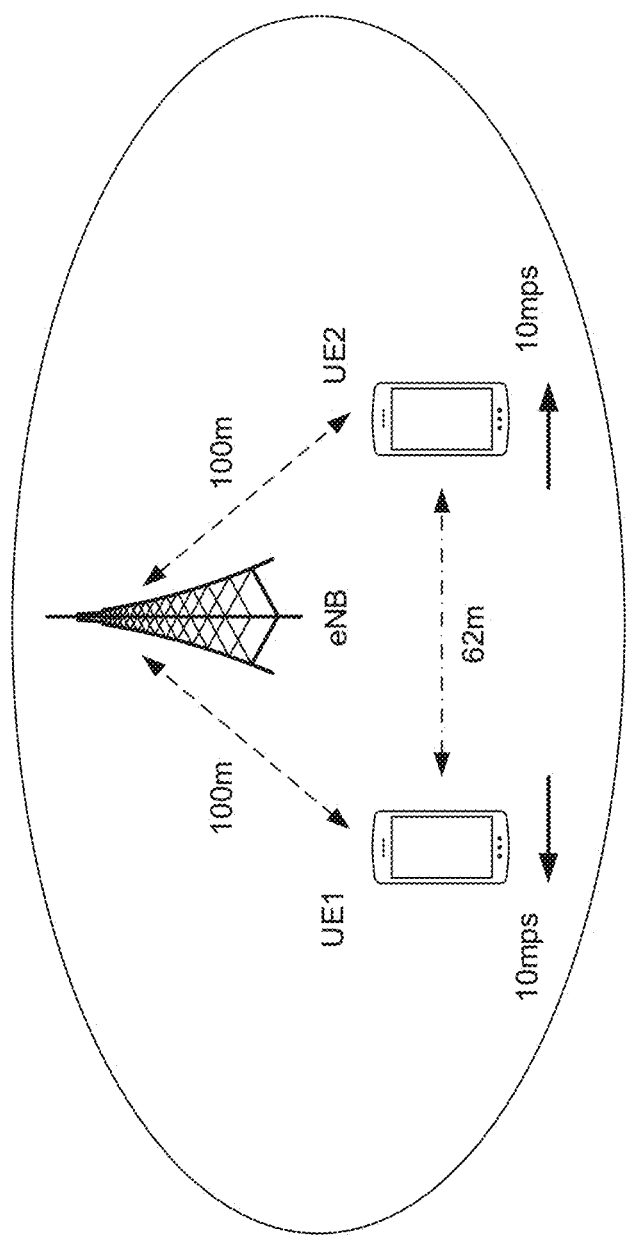
FIG. 7 depict initial geo-location of the mobile communication devices in simulation in accordance with an example embodiment of the present disclosure.

Simulation Results and Analyses:

In the present disclosure, for experimental results and analyses, SimuLTE simulator as known in the art was been used on top of OMNeT++ (e.g., refer https://inet.omnetpp.org, https://omnetpp.org). The primary goal of the simulation design was to create a near-realistic situation within a single cell such that a flow of events are obtained as depicted in FIG. 6. More specifically, FIG. 6, with reference to FIGS. 3 through 5, depicts flow of events between mobile communication devices (UE1 and UE2) and a base station (eNB), in accordance with an example embodiment of the present disclosure. The biggest challenge was to create a scenario, where, despite having to transmit a very short data, a mode-switching can be triggered realistically based on the CQI.

Initially, UEs (e.g., a first mobile communication device and a second mobile communication device) were placed 100 meters away each from the eNB (FIG. 7); wherein the UEs were 62 meters away from each other. More specifically, FIG. 7, with reference to FIGS. 3 through 6, depict initial geo-location of the mobile communication devices in simulation in accordance with an example embodiment of the present disclosure. Other simulation parameters are given in below Table 1 as non-limiting examples.

TABLE 1

| Parameters for simulation | | |
|---|---|---|
| LTE-A Parameters | Radio BW | 10 MHz |
| | Number of cells | 1 |
| | Number of UEs 2 | 2 |
| | D2D enabled | Yes. For both UEs. |
| | rwnd | 50 KB |
| | TCP MSS | 536 bytes |
| | TCP Version | Reno |
| | SACK | Disabled |
| TCP Parameters | TCP payload size (in KB) | 3/10/15/20 |
| | Min. RTO | 1 s |
| | Max RTO | 240 s |
| | RTO calculation | As per RFC 6298 |

Figure 8:
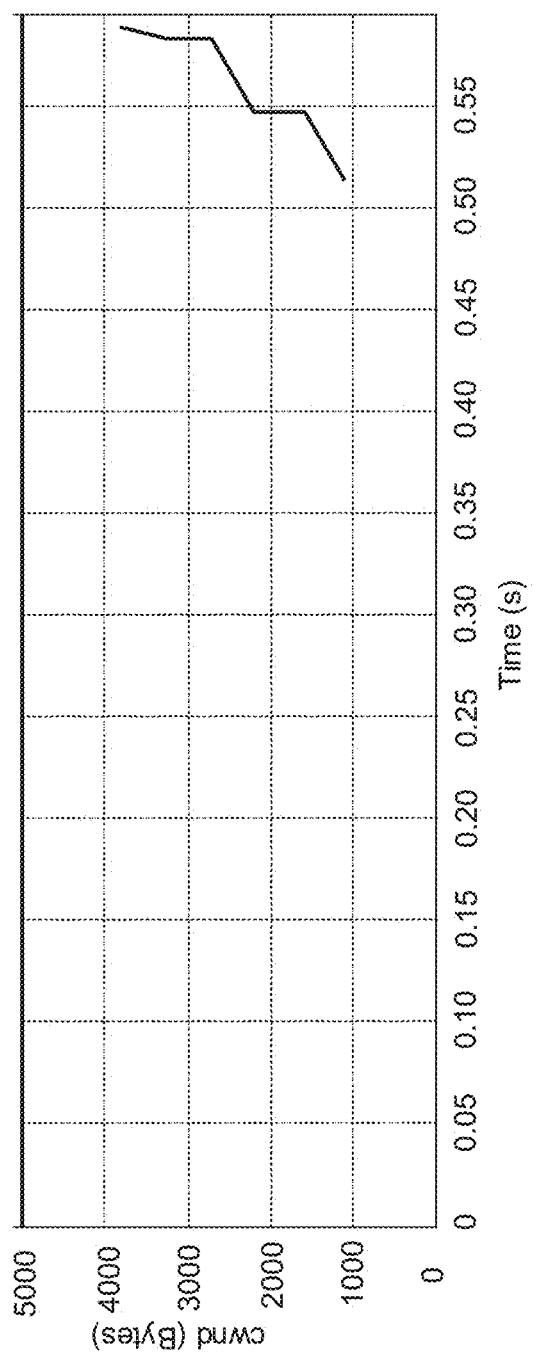
FIG. 8 shows congestion window for Infrastructure Mode and Direct Mode, respectively in accordance with an example embodiment of the present disclosure.

Initially, the UEs were let to communicate in IM and DM. FIG. 8 shows congestion window for Infrastructure Mode in accordance with an example embodiment of the present disclosure. The initial lag is due to the resource allocation delay at eNB and the connection establishment latency of TCP. As expected, the transfer completes quickly without encountering any loss.

Figure 9A:
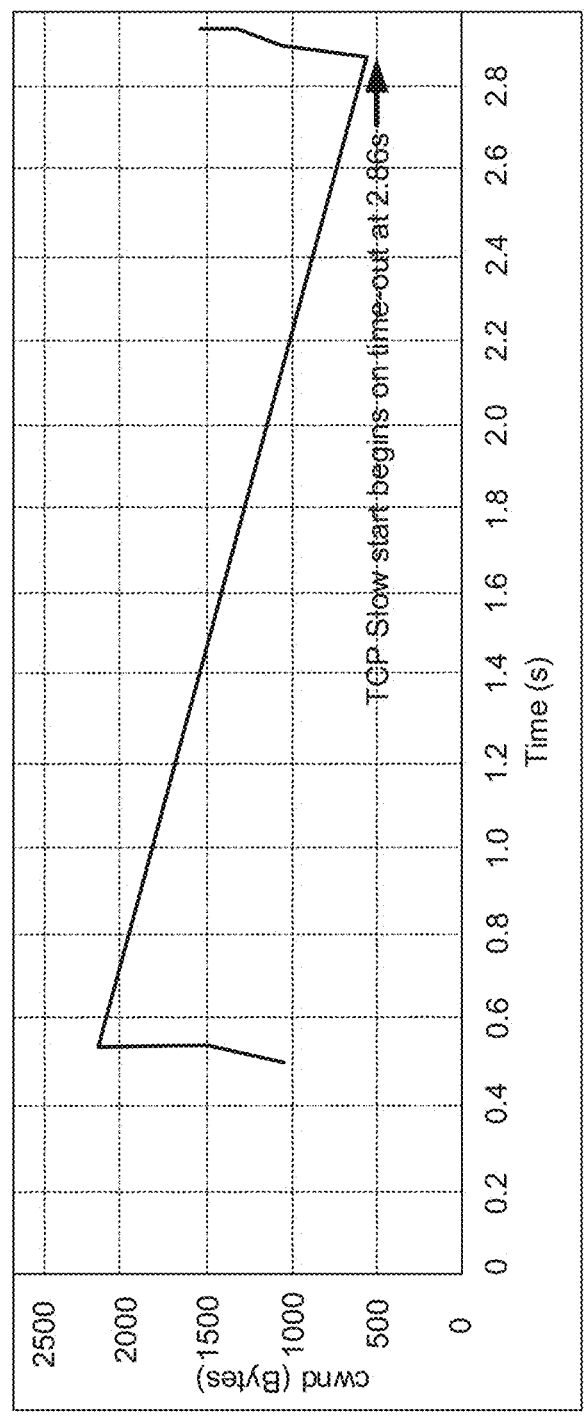
FIG. 9A depicts a graphical representation illustrating transmitter congestion window (cwnd) for transfer of 3 KB data under mode switching in accordance with an example embodiment of the present disclosure.
Figure 9B:
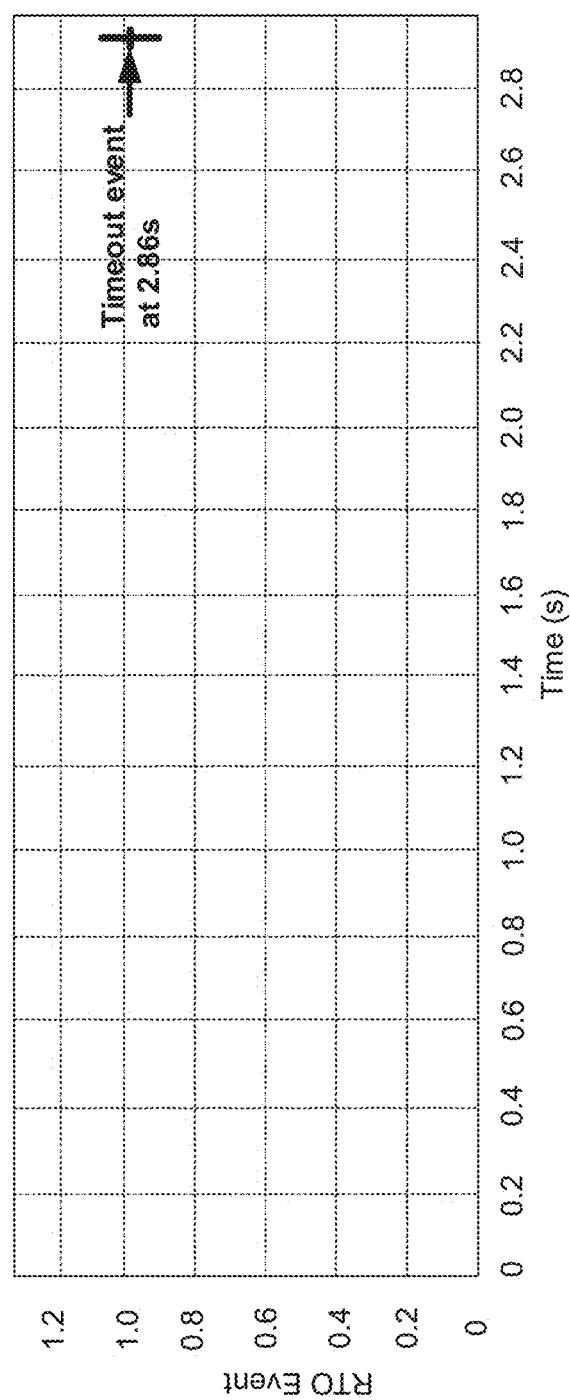
FIG. 9B depicts a graphical representation illustrating a Retransmission Time Out (RTO) event in accordance with an example embodiment of the present disclosure.
Figure 10A:
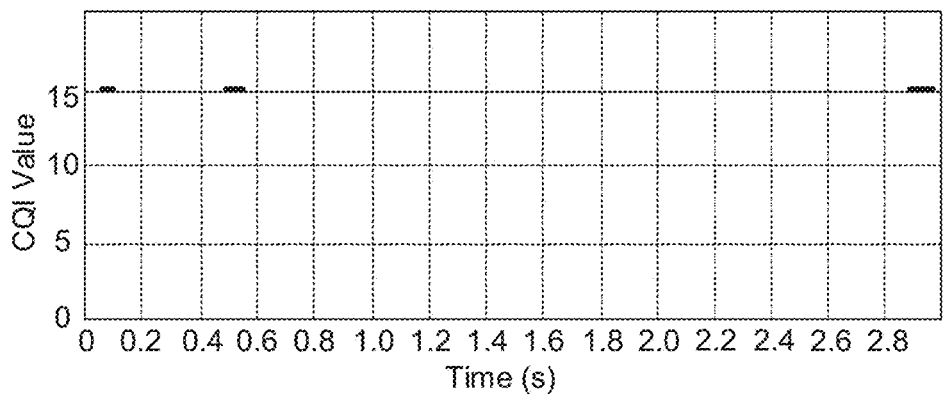
FIG. 10A depicts a graphical representation illustrating average Up Link (UL) Channel Quality Indicator (CQI) at the eNB in accordance with an example embodiment of the present disclosure.
Figure 10B:
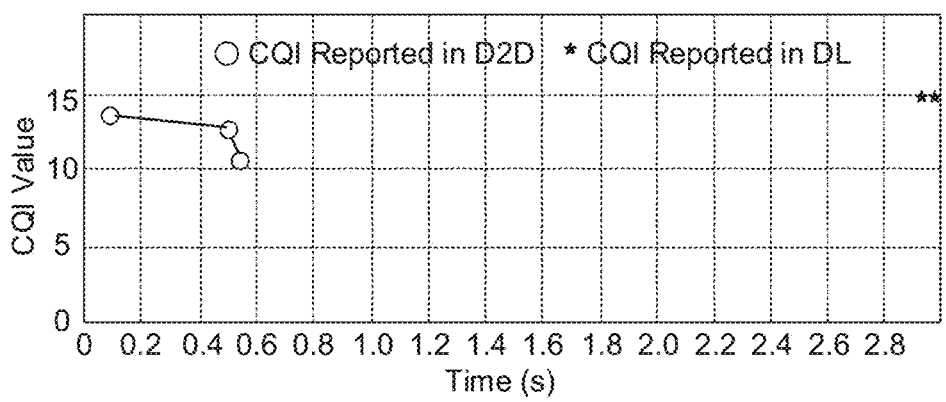
FIG. 10B depicts a graphical representation illustrating Variation of CQI at a transmitting node (e.g., a first mobile communication device), in accordance with an example embodiment of the present disclosure.
Figure 10C:
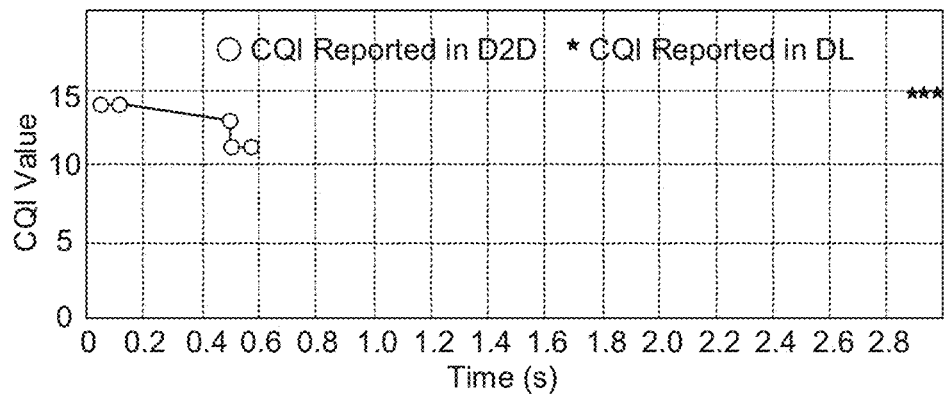
FIG. 10C shows the CQI variation at the receiving node (e.g., a second mobile communication device) in accordance with an example embodiment of the present disclosure.
Figure 11:
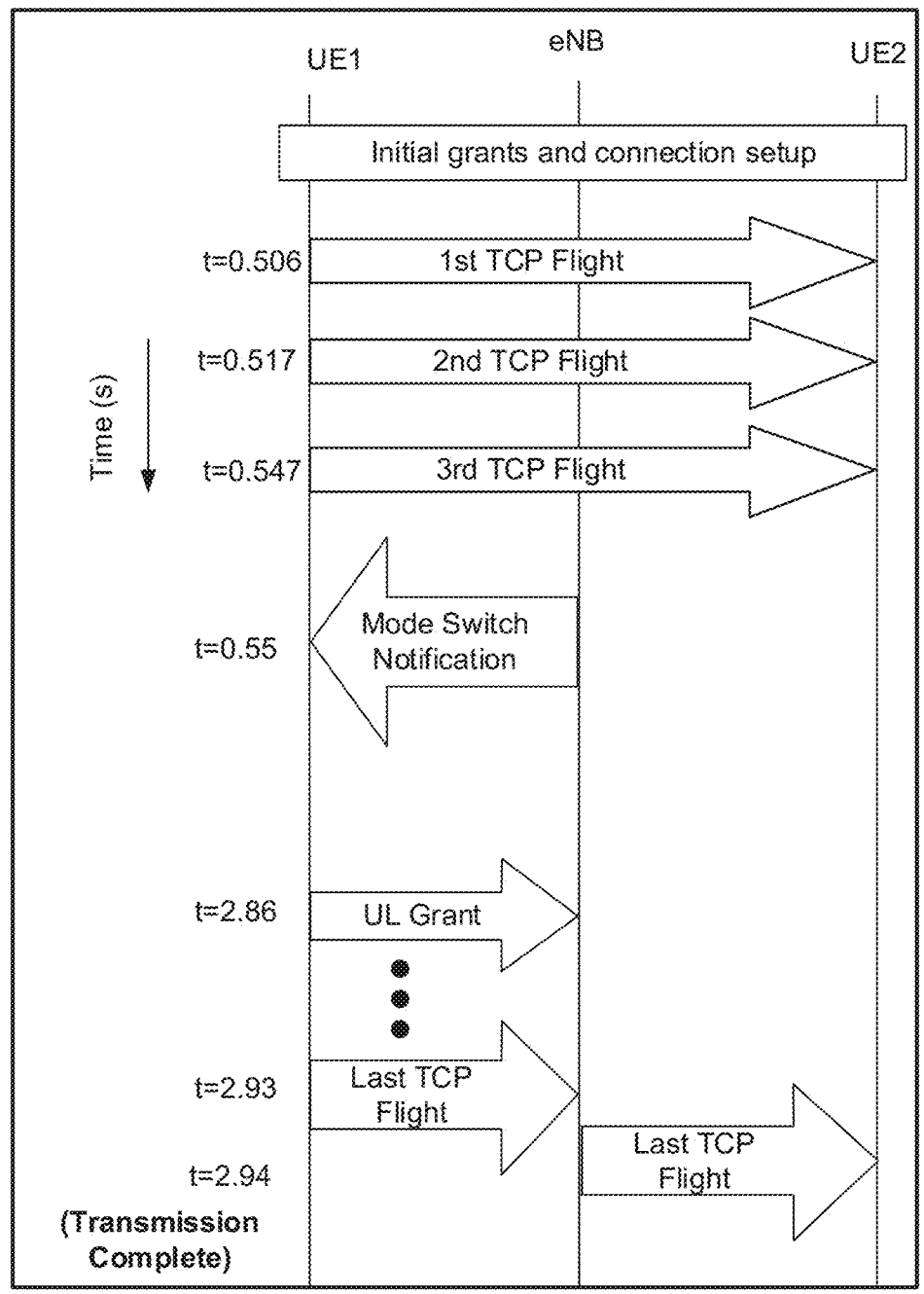
FIG. 11 depicts a timing diagram illustrating events during transfer of payload in accordance with an example embodiment of the present disclosure.

Then the UEs were further let to move away at a speed of 10 m/s (i.e., 36 km/h) to trigger mode-switching. The cwnd graph in FIGS. 9A-9B reflects a congestion event. More specifically, FIG. 9A, with reference to FIGS. 1 through 8, depicts a graphical representation illustrating transmitter congestion window (cwnd) for transfer of 3 KB data in mode switching in accordance with an example embodiment of the present disclosure. FIG. 9B, with reference to FIGS. 1 through 9A, depicts a graphical representation illustrating a Retransmission Time Out (RTO) event in accordance with an example embodiment of the present disclosure. As can be seen from FIGS. 9A-9B, there is no impairment on the radio channels. Congestion is also out of question in this case. The loss in this case is due to mode-switch. This is confirmed by the physical layer captures at the NIC modules of the UEs and the eNB (e.g., refer FIGS. 10A-10C). More specifically, FIG. 10A, with reference to FIGS. 3 through 9B, depicts a graphical representation illustrating average Up Link (UL) Channel Quality Indicator (CQI) at the eNB in accordance with an example embodiment of the present disclosure. The average UL CQI at the eNB is steady due to its maintaining nearly constant distance from both the UEs. FIG. 10B, with reference to FIGS. 3 through 10A, depicts a graphical representation illustrating Variation of CQI at a transmitting node (e.g., a first mobile communication device), in accordance with an example embodiment of the present disclosure. In FIG. 10B, the CQI at the transmitting node shows a dip due to increasing distance between the UEs. The connection disrupts close to the point where a dip in the congestion window (cwnd) is experienced. The right side of the graph shows the appearance of a DL CQI establishing the fact that the UE has been rescheduled in IM by the eNB. The appearance of the Down Link (DL) CQI coincides with RTO event in FIG. 9B. FIG. 10C, with reference to FIGS. 3 through 10B, shows the CQI variation at the receiving node (e.g., a second mobile communication device) in accordance with an example embodiment of the present disclosure. The nature of the graph is evidently similar to that of the transmitting node.

The present disclosure has further analyzed timing of the events logged during simulation. The important events are illustrated through the timing diagram of FIG. 11. More specifically, FIG. 11, with reference to FIGS. 3 through 10C, depicts a timing diagram illustrating events during transfer of payload in accordance with an example embodiment of the present disclosure. The mode-switch event was triggered from eNB at 0.55 seconds. The communication stalls until UE1 requests for grant at around 2.86 seconds. So, the overhead time due to mode-switch is 2.31 seconds. This observation is in sync with the congestion window (cwnd) as depicted in FIG. 9A-9B. Thus, even for very short transfer over TCP, a mode-switching can impact transfer and reduce the throughput because TCP considers it as congestion (triggered by timeout) and reacts with a slow-start phase.

Figure 12A:
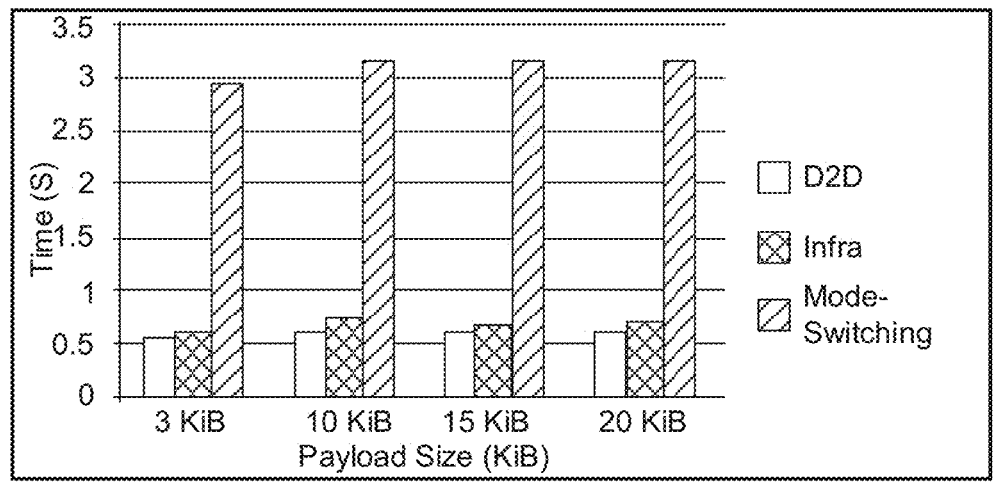
FIG. 12A depicts a graphical representation illustrating effect of mode-switching payloads on different sized short payload in accordance with an example embodiment of the present disclosure.
Figure 12B:
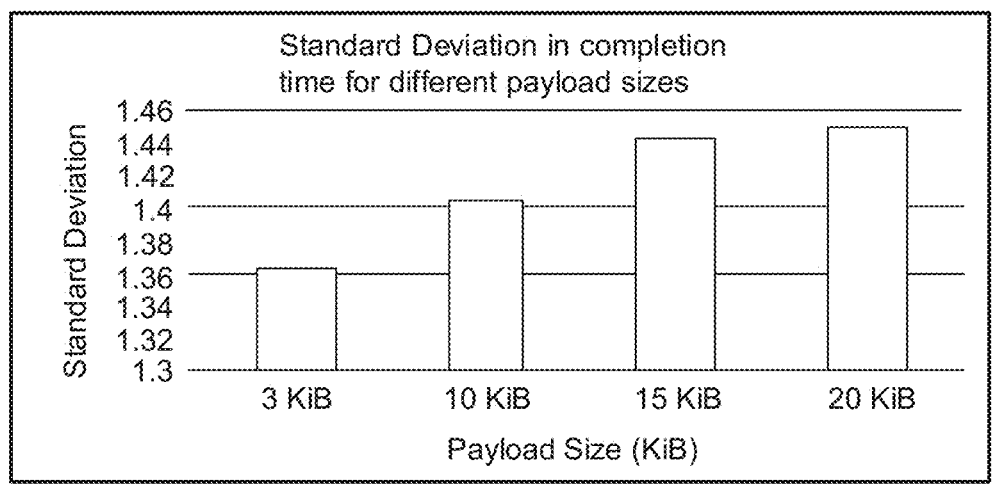
FIG. 12B depicts a graphical representation illustrating variance in exchange sizes for different payload sizes, in accordance with an example embodiment of the present disclosure.
Figure 13:
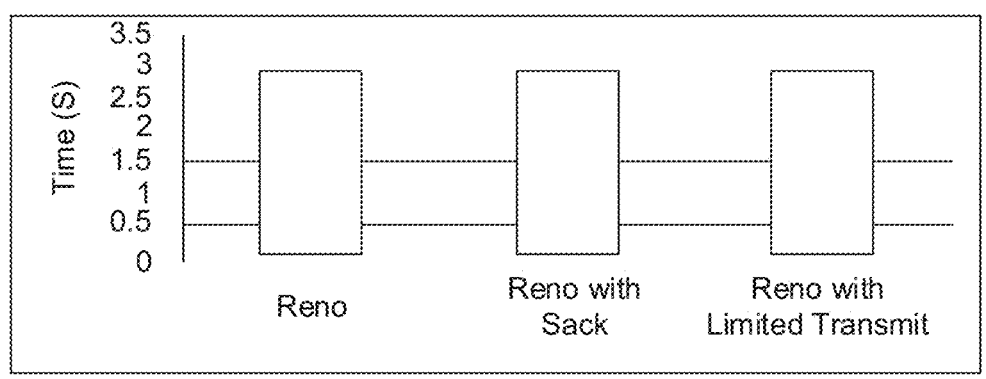
FIG. 13 depicts a graphical representation illustrating transmission time comparison among normal TCP-Reno, TCP-Reno with SACK and TCP-Reno with limited transmit as known in the art.

Next, impact on transmission time for different short data transfers, namely 10 KB, 15 KB and 20 KB was measured. FIGS. 12A-12B, with reference to FIGS. 3 through 11, depict graphical representations illustrating (a) effect of mode-switching payloads on different sized short payload and (b) Variance in exchange sizes for different payload sizes. More specifically, FIG. 12A, with FIGS. 3 through 11, depicts a graphical representation illustrating effect of mode-switching payloads on different sized short payload in accordance with an example embodiment of the present disclosure. FIG. 12B, with reference to FIGS. 3 through 12A, depicts a graphical representation illustrating variance in exchange sizes for different payload sizes, in accordance with an example embodiment of the present disclosure. The increment in transmission delay due to mode switching grows with data size. The variance of the transmission time also increases with increase in data size. Further investigations revealed that SACK and Limited-transmit optimizations fail to improve the performance as shown in FIG. 13. More specifically, FIG. 13, with reference to FIGS. 3 through 12B, depicts a graphical representation illustrating transmission time comparison among normal TCP-Reno, TCP-Reno with SACK and TCP-Reno with limited transmit as known in the art. Particularly, in FIG. 13, transmission time comparison among normal TCP-Reno, TCP-Reno with SACK and TCP-Reno with limited transmit shows no improvement by SACK and Limited Transmit algorithms. FIG. 13 shows that existing variations of TCP do not improve the problem in mode switching as is seen in the conventional art and conventional LTE stack architecture(s).

SACK is not able to improve because the transmit buffer has to be rejected in order to adjust to the new connection state. The receive buffer also has to reject anything that remains unacknowledged at the instant when mode-switching is triggered. Though Limited-Transmit algorithm is based on optimization on dupacks, since the buffers are outdated at the receiving end as well as the transmitting end, any delivery of future sequence also has to be rejected.

According to the results illustrated in FIG. 12A, the benefit in DM over IM is minuscule for such short flows. So, the present disclosure recommends that the transmitting UE should not indulge in mode-switch for this kind of scenario by always requesting resources in IM mode and never showing its interest in D2D communication despite being capable to do the same. Thus, the flow direction in the LCID in the BSR remains 'UL'. Going by the recommendation made by the present disclosure, a negligible performance tradeoff happens in terms of keeping the things frugal. To achieve the above, it is assumed by the present disclosure that the application has knowledge about the size of the message (payload of the TCP layer), and this knowledge can be used to configure the lower layers in the LTE-A stack (or LTE-A stack system 100). Therefore, in the present disclosure, before a scheduling grant request, the Application Layer in the UE (e.g., the first mobile communication device) intimates the RRC, through the Adaptation Layer, that the upcoming data is going to be very short, and hence an LCID with flow direction as "IM" (as described above) can be created (as can be seen in FIG. 4).

Embodiments of the present disclosure provides systems and methods that provide simulation results and analyses that have shown how mode-switching in D2D poses new challenge for TCP short transfers in V2V communications that is solved by present disclosure and its embodiments thereof by providing technical solution as depicted in FIGS. 4 and 5 via systems and methods of the present disclosure. Through experimental observations, it is found that, in a network assisted mode, short transfers in infrastructure mode provide more reliability in terms of guaranteeing the delivery within a time. So, the present disclosure provides a cross layer architecture as depicted in FIG. 4 so that without much change in the LTE-A stack, a short session can be always triggered in infrastructure mode by maneuvering the way the UEs ask for resource allocation to the NodeB (base station or eNB). The NodeB allocates a D2D channel when it sees that the participating UEs are close enough and the UEs are capable of D2D/ProSe communication. In the present disclosure, the systems and methods intelligently refrain the UEs from exposing their D2D capability to the eNodeB.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
receiving, by a transfer flow indicator comprised in a Long-Term Evolution-Advanced (LTE-A) stack, a first set of information comprising a flow size and a transport layer type specific to a request being initiated by a first communication device;
obtaining, from a LTE physical layer comprised in the LTE-A stack, a second set of information comprising bandwidth and a Round Trip Time (RTT) specific to the request being initiated by the first communication device;
determining, by the transfer flow indicator comprised in the LTE-A stack, based on the first set and second set of information, whether the request being initiated by the first communication device is one of a first TCP transfer flow type or a second TCP transfer flow type, wherein the first TCP transfer flow type and the second TCP transfer flow type are different from each other, and wherein the first TCP transfer flow type is a short transfer flow type;
enabling a first mode for communication between the first communication device and a second communication device;
determined by the transfer flow indicator, triggering a Radio Resource Control layer comprised in the LTE-A stack of the first communication device, to (i) identify the first mode to be disabled in the first communication device and (ii) request for permission to use one or more radio resources for a second mode for communication between the first communication device and the second communication device, wherein the permission to activate the second mode is initiated when the request is determined as the short transfer flow type.

2. The processor implemented method as claimed in claim 1, wherein the first mode is a Direct Mode (DM) or a Device to Device (D2D) communication mode.

3. The processor implemented method as claimed in claim 1, wherein the second mode is an Infrastructure Mode (IM).

4. The processor implemented method as claimed in claim 1, wherein the second TCP transfer flow type is a long transfer flow type.

5. The processor implemented method as claimed in claim 1, wherein the first mode is enabled when the request is determined as a long transfer flow type.

6. A Long Term Evolution-Advanced system, comprising:
a memory storing instructions;
one or more communication interfaces; and
one or more hardware processors coupled to the memory via the one or more communication interfaces, wherein the one or more hardware processors are configured by the instructions to:
receive, via a transfer flow indicator comprised in the Long-Term Evolution-Advanced (LTE-A) stack system, a first set of information comprising a flow size and a transport layer type specific to a request being initiated by a first communication device;
obtain, via the transfer flow indicator from a LTE physical layer comprised in the LTE-A stack system, a second set of information comprising bandwidth and a Round Trip Time (RTT) specific to the request being initiated by the first communication device;
determine, via the transfer flow indicator comprised in the LTE-A stack, based on the first set and second set of information, whether the request being initiated by the first communication device is one of a first TCP transfer flow type or a second TCP transfer flow type, wherein the first TCP transfer flow type and the second TCP transfer flow type are different from each other, and wherein the first TCP transfer flow type is a short transfer flow type;
enabling a first mode for communication between the first communication device and a second communication device;
determined via the transfer flow indicator, triggering a Radio Resource Control layer comprised in the LTE-A stack of the first communication device, to (i) identify the first mode to be disabled in the first communication device and (ii) request for permission to use one or more radio resources for a second mode for communication between the first communication device and the second communication device, wherein the permission to activate the second mode is initiated when the request is determined as the short transfer flow type.

7. The LTE-A stack system as claimed in claim 6, wherein the first mode is a Direct Mode (DM) or a Device to Device (D2D) communication mode.

8. The LTE-A stack system as claimed in claim 6, wherein the second mode is an Infrastructure Mode (IM).

9. The LTE-A stack system as claimed in claim 6, wherein the second TCP transfer flow type is a long transfer flow type.

10. The LTE-A stack system as claimed in claim 6, wherein the first mode is enabled when the request is determined as a long transfer flow type.

11. One or more non-transitory machine readable information storage mediums comprising one or more instructions which when executed by one or more hardware processors cause:
   receiving, by a transfer flow indicator comprised in a Long-Term Evolution-Advanced (LTE-A) stack, a first set of information comprising a flow size and a transport layer type specific to a request being initiated by a first communication device;
   obtaining, from a LIE physical layer comprised in the LTE-A stack, a second set of information comprising bandwidth and a Round Trip Time (RTT) specific to the request being initiated by the first communication device;
   determining, by the transfer flow indicator comprised in the LTE-A stack, based on the first set and second set of information, whether the request being initiated by the first communication device is one of a first TCP transfer flow type or a second TCP transfer flow type, wherein the first TCP transfer flow type and the second TCP transfer flow type are different from each other, and wherein the first TCP transfer flow type is a short transfer flow type;
   enabling a first mode for communication between the first communication device and a second communication device;
   determined by the transfer flow indicator, triggering a Radio Resource Control layer comprised in the LTE-A stack of the first communication device, to (i) identify the first mode to be disabled in the first communication device and (ii) request for permission to use one or more radio resources for a second mode for communication between the first communication device, and the second communication device, wherein the permission to activate the second mode is initiated when the request is determined as the short transfer flow type.

12. The one or more non-transitory machine readable information storage mediums of claim 11, wherein the first mode is a Direct Mode (DM) or a Device to Device (D2D) communication mode, and wherein the second mode is an Infrastructure Mode (IM).

13. The one or more non-transitory machine readable information storage mediums of claim 11, wherein the second TCP transfer flow type is a long transfer flow type.

14. The one or more non-transitory machine readable information storage mediums of claim 11, wherein the first mode is enabled when the request is determined as a long transfer flow type.

* * * * *